United States Patent
Burcham et al.

(10) Patent No.: US 10,555,130 B1
(45) Date of Patent: Feb. 4, 2020

(54) PRE-PROCESSING OF MOBILE COMMUNICATION DEVICE GEOLOCATIONS ACCORDING TO TRAVEL MODE IN TRAFFIC ANALYSIS

(71) Applicant: Sprint Communications Company L.P., Overland Park, KS (US)

(72) Inventors: Robert H. Burcham, Overland Park, KS (US); Matthew Habiger, Kansas City, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/379,784

(22) Filed: Apr. 9, 2019

(51) Int. Cl.
  *H04W 4/21*   (2018.01)
  *H04W 4/029*  (2018.01)
  *H04W 4/02*   (2018.01)
  *H04W 4/021*  (2018.01)

(52) U.S. Cl.
  CPC ........... *H04W 4/029* (2018.02); *H04W 4/021* (2013.01); *H04W 4/027* (2013.01)

(58) Field of Classification Search
  CPC ................................. H04W 4/21; H04W 4/29
  See application file for complete search history.

(56) References Cited

U.S. PATENT DOCUMENTS

| | | | |
|---|---|---|---|
| 8,391,836 B1 | 3/2013 | Bolot et al. | |
| 8,589,318 B2 | 11/2013 | Sundararajan et al. | |
| 9,122,693 B2 | 9/2015 | Blom et al. | |
| 9,326,096 B1 | 4/2016 | Gatmir-Motahari et al. | |
| 9,710,873 B1* | 7/2017 | Hill | G06T 1/20 |
| 10,332,151 B2 | 6/2019 | Megdal | |
| 2004/0254698 A1 | 12/2004 | Hubbard et al. | |
| 2009/0150217 A1 | 6/2009 | Luff | |
| 2009/0319177 A1 | 12/2009 | Khosravy et al. | |

(Continued)

FOREIGN PATENT DOCUMENTS

GB 2516513 A 1/2015

OTHER PUBLICATIONS

Burcham, Robert H., et al., "System and Method of Mobile Phone Location in a Subway Transit Environment," filed Apr. 9, 2019, U.S. Appl. No. 16/379,781.

(Continued)

*Primary Examiner* — Michael T Vu

(57) ABSTRACT

A geolocating method to determine a traffic flow at a point-of-interest (POI). The method comprises clustering geolocation data associated with a plurality of mobile communication devices by an analysis application executing on a computer system based on different clustering algorithms associated with different travel modes identified by the geolocation data, for each of the plurality of mobile communication devices, determining travel routes traversed by the mobile communication device by the analysis application based on the clustering of the geolocation data and based on a map of travel routes, where each of the travel routes is one of a highway travel route, a light rail travel route, or a footpath travel route, and, for each of a plurality of POIs, determining by the analysis application a number of different mobile communication devices that intersect with the POI based on the travel routes traversed by the mobile communication devices.

13 Claims, 10 Drawing Sheets

(56) References Cited

U.S. PATENT DOCUMENTS

| | | | |
|---|---|---|---|
| 2010/0279708 | A1 | 11/2010 | Lidsrom et al. |
| 2012/0008526 | A1 | 1/2012 | Borghei |
| 2012/0040637 | A1 | 2/2012 | Wigren |
| 2013/0267255 | A1 | 10/2013 | Liu et al. |
| 2015/0051829 | A1 | 2/2015 | Gearhart et al. |
| 2015/0081617 | A1 | 3/2015 | Shaik et al. |
| 2015/0088423 | A1* | 3/2015 | Tuukkanen ............ G01C 21/26 701/538 |
| 2015/0106011 | A1 | 4/2015 | Nesbitt |
| 2015/0149285 | A1 | 5/2015 | Schroeter |
| 2016/0330589 | A1* | 11/2016 | Tuukkanen ............ G01C 21/26 |
| 2017/0153113 | A1 | 6/2017 | Gotoh et al. |
| 2017/0187788 | A1 | 6/2017 | Botea et al. |
| 2017/0213240 | A1 | 7/2017 | Waldron et al. |
| 2018/0259356 | A1 | 9/2018 | Rolf et al. |
| 2018/0283896 | A1 | 10/2018 | Piemonte et al. |

OTHER PUBLICATIONS

Restriction Requirement dated Jan. 23, 2019, U.S. Appl. No. 15/944,512, filed Apr. 3, 2018.

FAIPP Pre-Interview Communication dated May 28, 2019, U.S. Appl. No. 15/944,512, filed Apr. 3, 2018.

Notice of Allowance dated Jul. 10, 2019, U.S. Appl. No. 15/944,512, filed Apr. 3, 2018.

FAIPP Pre-Interview Communication dated Aug. 28, 2019, U.S. Appl. No. 16/398,258, filed Apr. 29, 2019.

Dannamaneni, Prashanth, et al., "Mobile Phone Mobile Viewshed Analysis," filed Apr. 3, 2018, U.S. Appl. No. 15/944,512.

Burcham, Robert H., et al., "Adapting Content Presentation Based on Mobile Viewsheds," filed Dec. 11, 2017, U.S. Appl. No. 15/838,016.

Bobe, Brooke M., et al., "Mobile Communication Device Locations Data Analysis Supporting Build-Out Decisions", filed Apr. 9, 2019, U.S. Appl. No. 16/379,774.

Burcham, Robert, H., et al., "Route Building Engine Tuning Framework", filed Apr. 29, 2019, U.S. Appl. No. 16/398,254.

Burcham, Robert H., et al. "Point of Interest (POI) Definition Tuning Framework" filed Apr. 29, 2019, U.S. Appl. No. 16/398,258.

Burcham, Robert H., et al., "System and Method of Mobile Phone Location in a Subway Transit Environment," filed Apr. 9, 2019, U.S. Appl. No. 16/379,791.

Burcham, Robert H., et al., "Transformation of Point of Interest Geometries to Lists of Route Segments in Mobile Communication Device Traffic Analysis," filed Apr. 9, 2019, U.S. Appl. No. 16/379,786.

Burcham, Robert H., et al., "Pattern Matching in Point-of-Interest (POI) Traffic Analysis," filed Apr. 9, 2019, U.S. Appl. No. 16/379,789.

* cited by examiner

PRE-PROCESSING OF MOBILE COMMUNICATION DEVICE GEOLOCATIONS ACCORDING TO TRAVEL MODE IN TRAFFIC ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Geolocations of mobile communication devices can serve as proxies for geolocations of human beings. By determining the geolocation of mobile communication devices at specific times, storing this time-associated geolocation data in a data store, and analyzing the geolocation data, a variety of useful information can be generated. For example, a rate of human beings traversing an area at specific times of day and days of the week can be inferred. A speed of human beings (e.g., the cars which the human beings are driving or riding in) traversing an area can be inferred.

SUMMARY

In an embodiment, a geolocating method of sorting geolocation data associated with a plurality of mobile communication devices into different travel modes, clustering the geolocation data according to different clustering algorithms based on the different travel modes of the geolocation data, determining travel routes traversed by the plurality of mobile communication devices based on the clustering of the geolocation data, and analyzing the intersections of points-of-interest (POIs) and the travel routes to determine a traffic flow at the POI is disclosed. The method comprises storing a map of travel routes in a first data store, where each of the travel routes is one of a highway travel route, a light rail travel route, or a footpath travel route and storing geolocation data associated with a plurality of mobile communication devices in a second data store, where each item of geolocation data identifies a location of a mobile communication device, identifies the mobile communication device, identifies a cell site to which the mobile communication device attached to, and identifies a timestamp comprising a date and a time. The method further comprises designating some of the geolocation data stored in the second data store by an analysis application executing on a computer system as associated with a light rail travel mode based on the identity of the cell site contained in the geolocation data and designating some of the geolocation data stored in the second data store by the analysis application as associated with a footpath travel mode based on the location contained in the geolocation data. The method further comprises inferring a speed of travel associated with some of the geolocation data by the analysis application, designating some of the geolocation data stored in the second data store by the analysis application as associated with a highway travel mode based on the inferred speed of travel associated with the geolocation data, and designating some of the geolocation data stored in the second data store by the analysis application as associated with the footpath travel mode based on the inferred speed of travel associated with the geolocation data. The method further comprises clustering the geolocation data associated with the light rail travel mode by the analysis application based on a light rail travel mode clustering algorithm, clustering the geolocation data associated with the footpath travel mode by the analysis application based on a footpath travel mode clustering algorithm, and clustering the geolocation data associated with the highway travel mode by the analysis application based on a highway travel mode clustering algorithm. The method further comprises, for each of the plurality of mobile communication devices, determining travel routes traversed by the mobile communication device based on the clustering of the geolocation data by the analysis application and based on the map of travel routes and, for each of a plurality of POIs, determining by the analysis application a number of different mobile communication devices that intersect with the POI based on the travel routes traversed by the mobile communication devices, whereby traffic flows at the geolocation of the POIs are determined.

In another embodiment, a geolocating system that clusters geolocation data associated with a plurality of mobile communication devices according to different clustering algorithms based on different travel modes associated with the geolocation data, determines travel routes traversed by the plurality of mobile communication devices based on the clustering of the geolocation data, and analyzes the intersections of points-of-interest (POIs) and the travel routes to determine a traffic flow at the POI is disclosed. The system comprises at least one processor, a non-transitory memory, a first data store comprising a map of travel routes, where each travel route is one of a highway travel route, a light rail travel route, or a footpath travel route, a second data store comprising geolocation data associated with a plurality of mobile communication devices, where each item of geolocation data identifies a location of a mobile communication device, identifies the mobile communication device, identifies a travel mode, and identifies a timestamp comprising a date and a time, and an analysis application stored in the non-transitory memory. When executed by the at least one processor the analysis application clusters the geolocation data associated with a highway travel mode based on a highway travel mode clustering algorithm, clusters the geolocation data associated with a light rail travel mode based on a light rail travel mode clustering algorithm, and clusters the geolocation data associated with a footpath travel mode based on a footpath travel mode clustering algorithm. The analysis application further, for each of the plurality of mobile communication devices, determines travel routes traversed by the mobile communication device based on the clustering of the geolocation data and based on the map of travel routes, and, for each of a plurality of POIs, determines a number of different mobile communication devices that intersect with the POI based on the travel routes traversed by the mobile communication devices, whereby traffic flows at the geolocation of the POIs are determined.

In yet another embodiment, a geolocating method of clustering geolocation data associated with a plurality of mobile communication devices according to different clustering algorithms based on different travel modes associated with the geolocation data, determining travel routes traversed by the plurality of mobile communication devices based on the clustering of the geolocation data, and analyzing the intersections of points-of-interest (POIs) and the travel routes to determine a traffic flow at the POI is disclosed. The method comprises storing a map of travel routes in a first data store, where each of the travel routes is one of a highway travel route, a subway travel route, or a footpath travel route and storing geolocation data associated with a plurality of mobile communication devices in a second data store, where each item of geolocation data identifies a location of a mobile communication device, identifies the mobile communication device, identifies a travel mode, and identifies a timestamp comprising a date and a time. The method further comprises clustering the geolocation data associated with the mobile communication devices by an analysis application executing on a computer system based on a different clustering algorithm associated with each different travel mode, for each of the plurality of mobile communication devices, determining travel routes traversed by the mobile communication device based on the clustering of the geolocation data by the analysis application and based on the map of travel routes, and, for each of a plurality of POIs, determining by the analysis application a number of different mobile communication devices that intersect with the POI based on the travel routes traversed by the mobile communication devices, whereby traffic flows at the geolocation of the POIs are determined.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
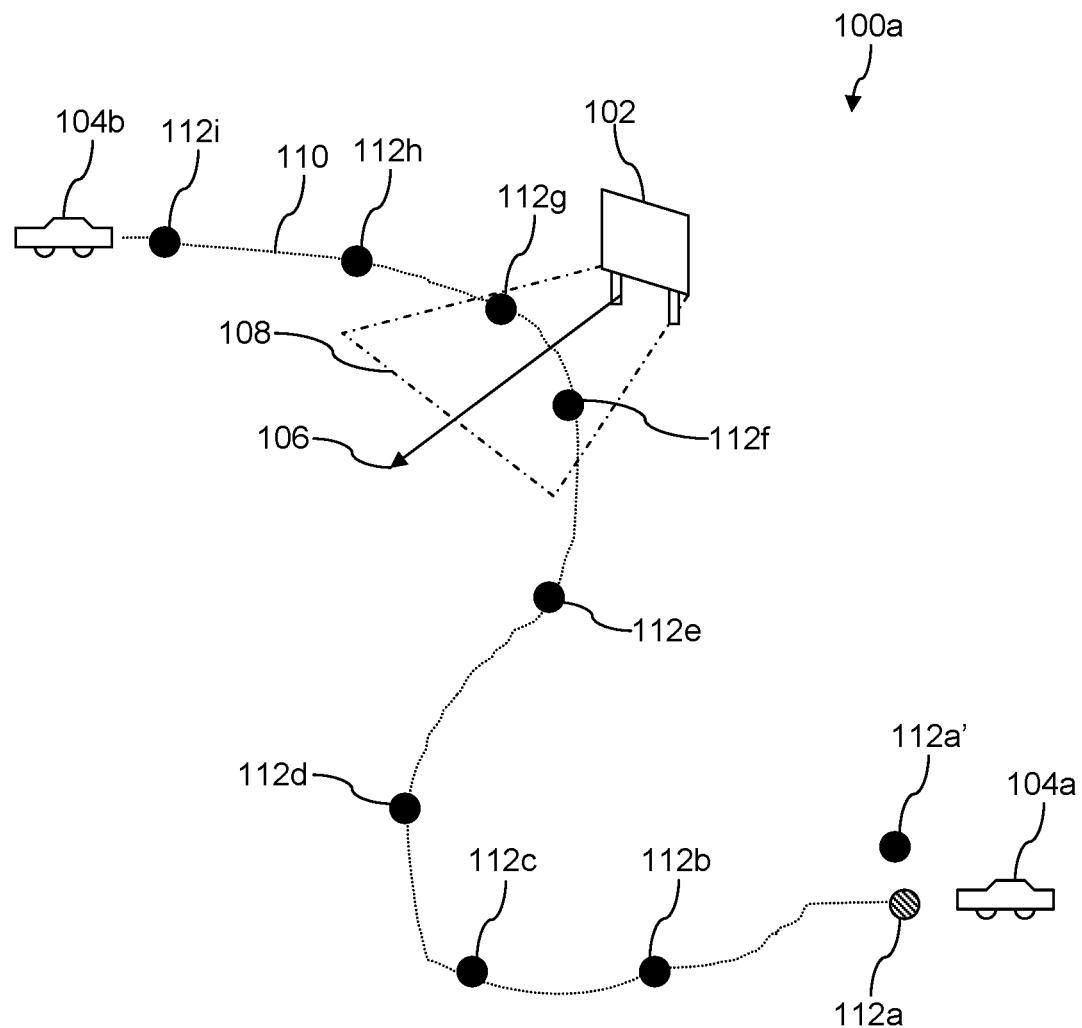
FIG. 1A is an illustration of a highway travel route and a plurality of geolocations of a mobile communication device along the highway travel route according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Geolocation data pertaining to mobile communication devices can be collected by wireless communication service providers and analyzed to derive valuable information on the presence, dwell times, and movements of human beings. This information can be used to plan and adapt highway systems, construction plans, and business plans. This information can be used to establish values and prices for presenting content on billboards and on digital screens outside of the home. It is observed that in such analysis, the geolocation of the mobile communication device serves as a proxy for the geolocation of the human being using the mobile communication device.

Geolocation data associated with mobile communication devices may cluster around locations where the mobile communication devices dwell for extended periods of time, for example at a home of a user or at a workplace of a user. When the user is commuting from home to work and from work to home, few geolocation data points may be collected from the device along a travel route between home and work due to the relatively short duration of commutes. According to the system and methods disclosed herein, geolocation data that has been collected from a mobile communication device is processed by an analysis application executing on a computer system using clustering algorithms to create clusters of the geolocation data, and a centroid of the clusters determined. These centroids may be deemed putative locations of the mobile communication device. A travel route between the centroids of two geolocation clusters can be determined by the analysis application based on an assumed travel mode (e.g, one of a highway travel mode, a light rail travel mode, and a footpath travel mode). For example, if a subway travel mode (e.g., a kind of light rail travel mode) is assumed for some of the geolocations, those geolocations may be processed using a subway (or a light rail) travel mode clustering algorithm to cluster these geolocations and determine associated cluster centroids. Alternatively, if a highway travel mode is assumed for others of the geolocations, those other geolocations may be processed using a highway travel mode clustering algorithm to cluster these other geolocations and determine associated cluster centroids.

When cluster centroids have been determined, the analysis application may select an imputed travel route between the centroids from a digital map of travel routes based on the assumed travel mode and based on identifying a shortest path between the centroids, for example using an open source routing machine. Thus, if the assumed travel mode is a footpath travel mode, a shortest path footpath travel route of the digital map may be determined by the analysis application to be the imputed travel route. If the assumed travel mode is a highway travel mode, a shortest path highway travel route of the digital map may be determined by the analysis application to be the imputed travel route. The analysis application may automatically generate a plurality of inferred geolocations between the two centroids such that the inferred geolocations are located on the imputed travel route and are associated with timestamps consistent with timestamps associated with the two centroids and a direction of travel between the two centroids.

In an embodiment, the digital map may represent travel routes as a sequence of route segments that abut one another. For example a first end of a first route segment abuts a first end of a second route segment, a second end of the second route segment abuts a first end of a third route segment, a second end of the third route segment abuts a first end of a fourth route segment, etc. In an embodiment, these route segments may comprise mathematical abstractions or computer representations referred to as edges and vertices (route segments abut one another at the vertices). In an embodiment, the locations of the geolocations may be designated by the route segment to which they are associated.

The analysis application can compare the locations of the geolocations to the definition of the location of a point-of-interest (POI) to determine if the mobile communication device passes through or intersects the area of the POI. A POI may be associated with a building, a sports venue, a billboard, or a presentation screen. The analysis application can determine the numbers of mobile communication devices that intersect the POI and provide useful traffic statistics such as how many mobile communication devices intersect with the POI per day, how many mobile communication devices intersect with the POI during specific hours during the day.

The present disclosure contemplates that the travel mode associated with geolocation data may be inferred in a variety of different ways. Geolocation data may comprise a location, an identity of the mobile communication device, an identity of a cell site to which the device is attached, and a timestamp comprising a date and time. The analysis application may maintain a list of subway cell site identities, and if the identity of the cell site contained in the geolocation data matches a subway cell site identity, that geolocation data is assumed to be associated with a subway travel mode.

The analysis application may maintain a list of other radio resources located in the subways, for example WiFi access points, radio beacons associated with signage, subway system management radios, or other radio emitters. In an embodiment, the geolocation data provided by the mobile communication devices may comprise information about these other radio resources detected by the mobile communication device, for example SSIDs of WiFi access points and radio identities of other radio emitters. These radio identities can be mapped to the list of radio resources by the analysis application, and the analysis application can then infer that the mobile communication device is associated with a subway travel mode. In a like manner, radio identities or protocols that may be associated with other specific travel modes may be relied upon by the analysis application to assign a travel mode and therefore appropriately process location fix data. For example, radio protocols or radio frequency bands associated with metropolitan bus travel (e.g., radio resources employed by the buses and/or bus routing system) may be used by the analysis application to infer a bus travel mode. For example, radio protocols or radio frequency bands associated with light rail travel (e.g., radio resources employed by the light rail system to manage and operate the light rail system) may be used by the analysis application to infer a light rail travel mode.

The analysis application may maintain a list of geofenced areas that are associated with specific travel modes, for example a city park geofenced area may be associated with a footpath travel mode and an interstate highway geofenced area may be associated with a highway travel mode. If the location of the geolocation data falls within a geofenced area associated with a footpath travel mode, that geolocation data is assumed to be associated with a footpath travel mode. If the location of the geolocation data falls within a geofenced area associated with a highway travel mode, that geolocation data is assumed to be associated with a highway travel mode.

The association of a travel mode to the geolocation data based on either a cell site identity matching a known subway cell site identity or a location matching a geofenced area can be determined rapidly by the analysis application executing on a computer. Geolocation data that cannot be associated to a travel mode based on these considerations may be analyzed more painstakingly to determine an assumed travel mode. For example, the analysis application may analyze the timestamps associated with a plurality of geolocation data to infer a speed of travel associated with one or more of the geolocation data. If the inferred speed is above a first predefined speed threshold, the geolocation data is associated to the highway mode of travel. If the inferred speed is below a second predefined speed threshold, where the second speed threshold is less than the first speed threshold, the geolocation data is associated to the footpath travel mode.

Some geolocation data may not be attributed to an assumed travel mode based on any of the above approaches. For this geolocation data, the geolocation data may be clustered according to both the highway travel mode clustering algorithm and the footpath travel mode clustering algorithm, the inferred geolocations between the travel mode centroids determined on the highway travel route, the inferred geolocations between the footpath travel mode centroids determined on the footpath travel route, and the fit of these alternate solutions evaluated to select a best fit. The best fit solution may then be used to analyze intersections of the mobile communication device with the POIs. In an embodiment, a history of travel type routes previously followed by a UE 144 may be used to resolve attribution of the assumed travel mode.

Turning now to FIG. 1A, a first environment 100a is described. A plurality of geolocations 112 associated with a mobile communication device are shown located in the environment. The term geolocation as used herein may refer to a specific location or to a data structure or data object that comprises information about a specific location. A geolocation (i.e., a geolocation data object) comprises an identity of a mobile communication device, an identity of a cell site the mobile communication device is attached to when the geolocation is created, a location, a timestamp comprising a date and a time, and an optional tile identity. Geographical tiles are described further hereinafter.

In FIG. 1A, it is assumed that the user of the mobile communication device travels from a first geolocation 112a' that has an earlier timestamp to a tenth geolocation 112i that has a later timestamp along a highway travel route 110 in a motor vehicle 104. The first geolocation 112a' is not located on the highway travel route 110, so a second geolocation 112a is substituted by an analysis application in place of the first geolocation 112a'. The illustration of the first vehicle 104a represents the vehicle 104 starting its traverse of the highway travel route 110, and the illustration of the second vehicle 104b represents the vehicle 104 at the completion of its traverse of the highway travel route 110. The plurality of geolocations 112 further comprise a third geolocation 112b, a fourth geolocation 112c, a fifth geolocation 112d, a sixth geolocation 112e, a seventh geolocation 112f, an eighth geolocation 112g, and a ninth geolocation 112h. Some of the geolocations 112 may be inferred based on imputing the highway travel route 110 as a route traveled by the mobile communication devices between the first geolocation 112a' and the tenth geolocation 112i.

A timestamp of the second geolocation 112a is the same as the first geolocation 112a', a timestamp of the third geolocation 112b is later than the timestamp of the second geolocation 112a, a timestamp of the fourth geolocation 112c is later than the timestamp of the third geolocation 112b, a timestamp of the fifth geolocation 112d is later than the timestamp of the fourth geolocation 112c, a timestamp of the sixth geolocation 112e is later than the timestamp of the fifth geolocation 112d, the timestamp of the seventh geolocation 112f is later than the timestamp of the sixth geolocation 112e, a timestamp of the eighth geolocation 112g is later than the timestamp of the seventh geolocation 112f, a timestamp of the ninth geolocation 112h is later than the timestamp of the eighth geolocation 112g, and the timestamp of the tenth geolocation 112i is later than the timestamp of the ninth geolocation 112h.

The seventh geolocation 112f and the eighth geolocation 112g are located proximate to a point-of-interest (POI) 102. The POI 102 may be a digital billboard, an event venue, a business location, or a presentation screen in a subway. While the term point-of-interest may be allude to a "point," in fact the POI 102 is commonly extended in two dimensions and possibly three dimensions. The extended region associated with the POI 102 may be partially related to the inherent indefiniteness of geolocations associated with mobile communication device location accuracy limitations. The extended region associated with the POI 102 may be related to the human response due to proximity to a location. For example, if one is running weekend errands which involve driving within 200 feet of a specialty coffee shop, this may be close enough that one treats oneself to a cup of specialty coffee, whereas if one drives only within 1000 feet of the same specialty coffee shop, one does not bother to interrupt the smooth completion of errands by making that detour. With reference to a billboard, a POI 102 may be the extended area from which the billboard can be viewed and taken in (e.g., text content read, visual image comprehended).

This extended area associated with the POI 102 may be modeled as the area enclosed by a perimeter 108. An orientation 106 may be associated with the POI 102, for example to indicate a preferred or more sensitive direction of approaching the POI 102 to most fully experience or interact with the POI 102. When a mobile communication device passes through the extended area associated with the POI 102—when geolocations of the mobile communication device are located within the perimeter 108 of the POI 102—the mobile communication device is said to intersect with the POI 102. Because the mobile communication device is a proxy for the presence of the device user, intersections can be analyzed to infer presence of users in the proximity of the POI 102.

Figure 1B:
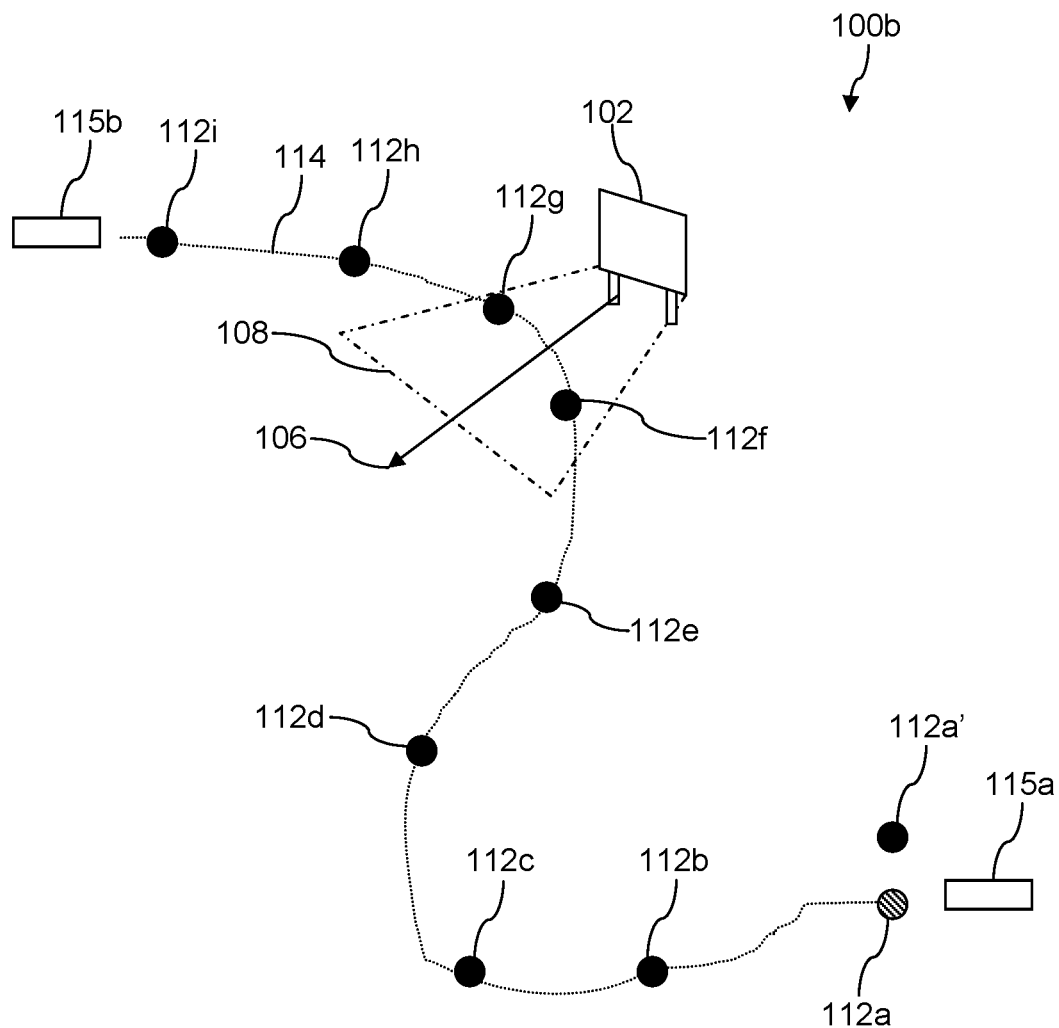
FIG. 1B is an illustration of a light rail travel route and a plurality of geolocations of a mobile communication device along the light rail travel route according to an embodiment of the disclosure.

Turning now to FIG. 1B, a second environment 100b is described. Several of the geolocations 112 in the second environment 100b may be the same as the geolocations 112 in the first environment 100a, but in the second environment 100b it is assumed that the user of the mobile communication device travels from the first geolocation 112a' to the tenth geolocation 112i along a light rail travel route 114 in a rail car 115. The illustration of the first rail car 115a represents the rail car starting its traverse of the light rail route 114, and the illustration of the second rail car 115b represents the rail car at the completion of its traverse of the light rail travel route 114. Some of the geolocations 112 may be inferred based on imputing the light rail travel route 114 as a route traveled by the rail car 114 between the first geolocation 112a' and the tenth geolocation 112i. Thus, it may be that different geolocations 112 are inferred for a mobile communication device traversing an area between two actual geolocations 112 if different travel modes are assumed when drawing the inferences.

Figure 1C:
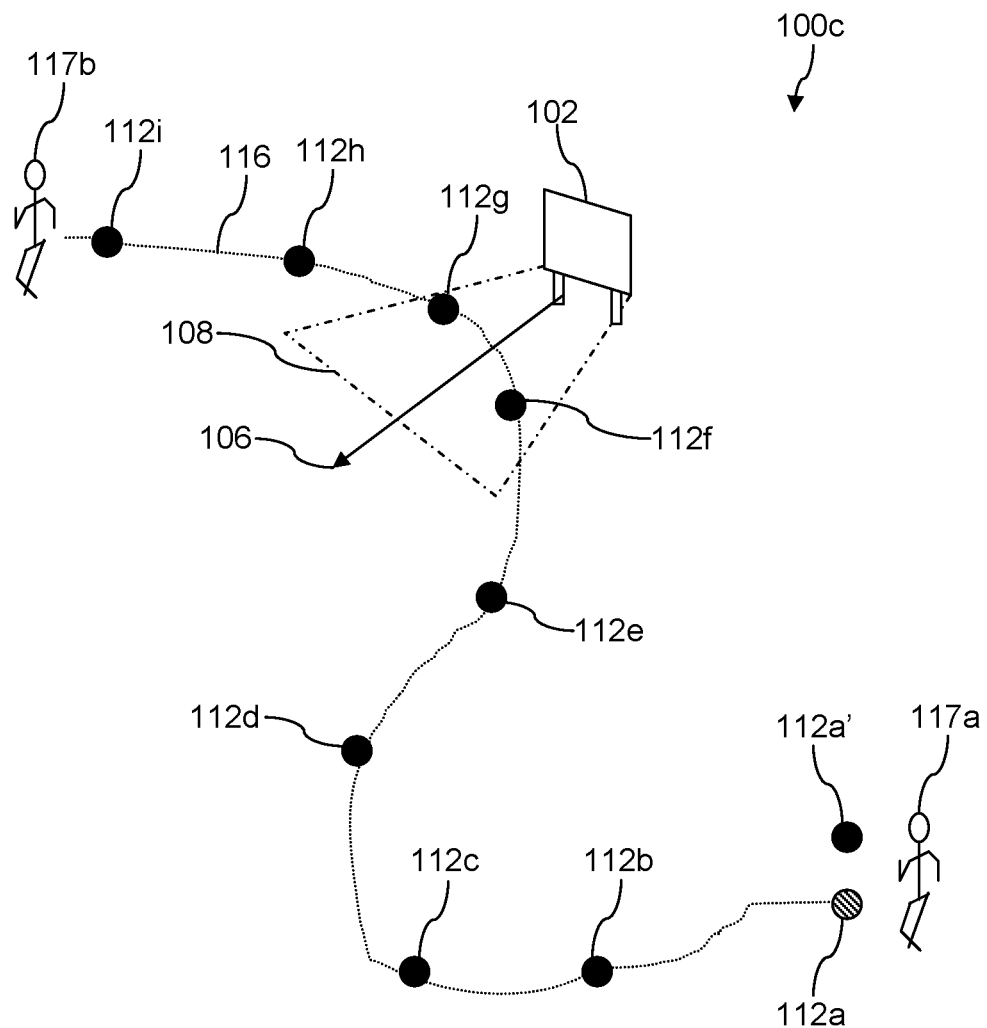
FIG. 1C is an illustration of a footpath travel route and a plurality of geolocations of a mobile communication device along the footpath travel route according to an embodiment of the disclosure.

Turning now to FIG. 1C, a third environment 100c is described. Several of the geolocations 112 in the third environment 100c may be the same as the geolocations 112 in the first environment 100a and/or in the second environment 100b, but in the third environment 100c it is assumed that the user of the mobile communication device is walking and travels from the first geolocation 112a' to the tenth geolocation 112i along a footpath travel route 116. The illustration of the first walker 117a represents the walker starting his or her traverse of the footpath travel route 116, and the illustration of the second walker 117b represents the walker at the completion of his or her traverse of the footpath travel route 116. Some of the geolocations 112 may be inferred based on imputing the footpath travel route 117 as a route traveled by the walker 117 between the first geolocation 112a' and the tenth geolocation 112i.

Figure 2A:
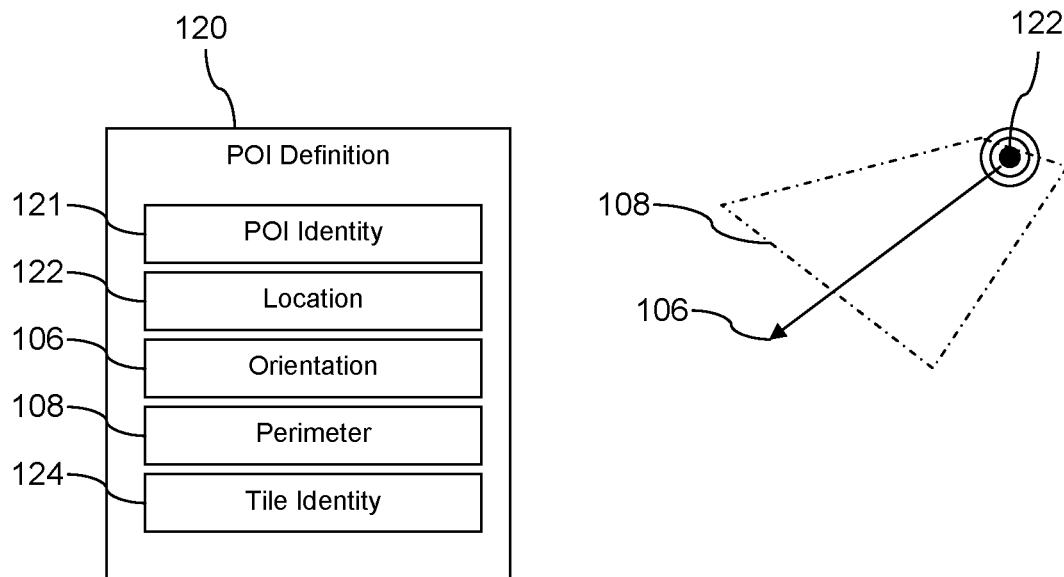
FIG. 2A is an illustration of a point-of-interest (POI) and a POI definition data structure according to an embodiment of the disclosure.

Turning now to FIG. 2A, in addition to being represented by an orientation 106 and a perimeter 108, the POI 102 may also be represented by a point location 122, much as an extended city may be represented abstractly by a single point such as a city hall or a county court house when calculating distances between different cities by mapping software. The point location 122 may be represented as a latitude-longitude value pair, as a geohash, or as a different location format. The POI 102 may be represented by a POI definition 120 that may be a data structure stored in a data store. The POI definition 120 comprises a POI identity 121, the point location 122, the orientation 106, and the perimeter 108. In an embodiment, the POI definition 120 further comprises a tile identity 124 of a geographical tile within which the point location 122 is located. Geographical tiles are described further hereinafter. In an embodiment, the location 122 may be defined in a different way, for example as one or more route segments that are contained within the perimeter 108.

Figure 2B:
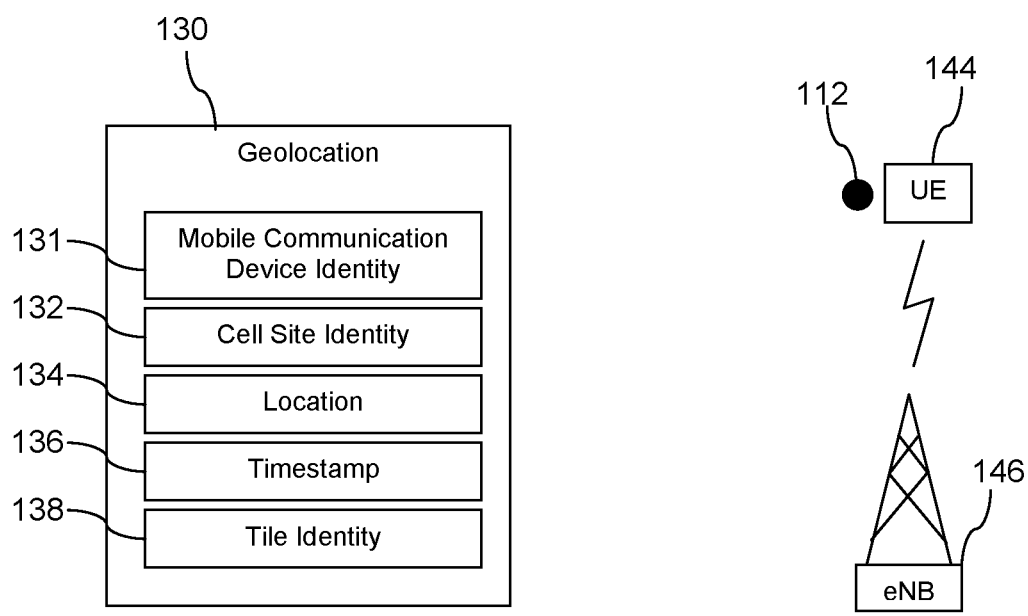
FIG. 2B is an illustration of a geolocation and a geolocation data structure according to an embodiment of the disclosure.

Turning now to FIG. 2B, a geolocation 130 is described. The geolocation 130 is a data structure for storing information about geolocations 112 associated with mobile communication devices in a data store. The geolocation 130 comprises information about the geolocation 112 of a mobile communication device (user equipment "UE") 144 captured at a point in time. This information comprises a mobile communication device identity 131, a cell site identity 132, a location 134 of the UE 144 at a point in time, a timestamp 136 comprising a date and time which identifies the point in time the location of the UE 144 is captured, and an optional tile identity 138 of a geographical tile within which the location 134 is located. The location 134 of the geolocation 130 may be stored as a latitude-longitude value pair, as a geohash, or as a different format of location. Tiles are described further herein after. In some cases the cell site identity 132 may be null or blank, for example if the geolocation 130 was captured when UE 144 was out of radio coverage (e.g., if the UE 144 captures and stores geolocations 130 when out of cellular radio coverage and uploads these captured geolocations 130 at a later time when it is again in cellular radio coverage).

Figure 3:
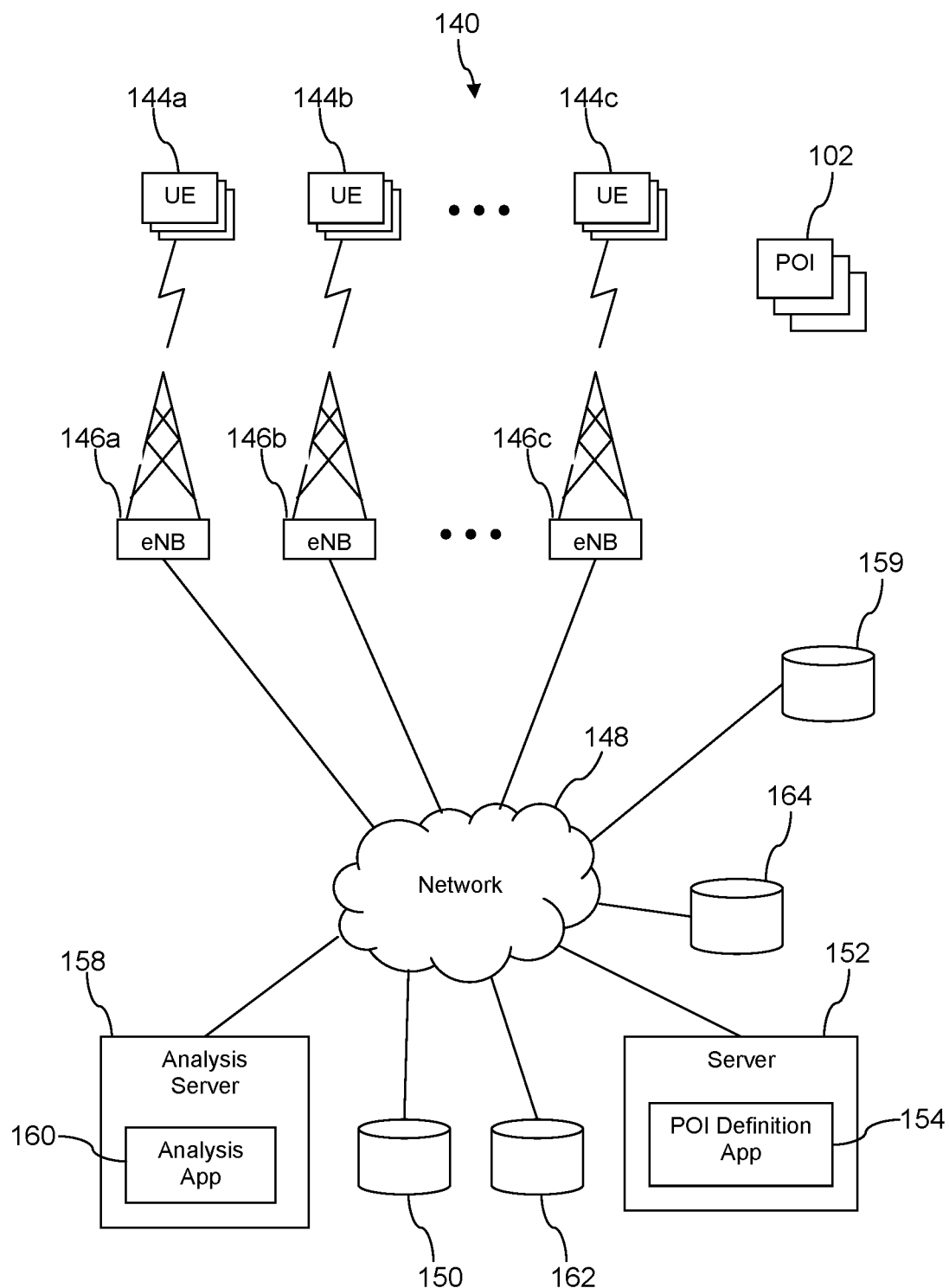
FIG. 3 is a block diagram of a system according to an embodiment of the disclosure.

Turning now to FIG. 3, a system 140 is described. In an embodiment, the system 140 comprises a plurality of points-of-interest (POIs) 102, a first plurality of mobile communication devices (UEs) 144a, a second plurality of UEs 144b, and a third plurality of UEs 144c. The POIs 102 may be associated with buildings, sports venues, billboards, or presentation screens. The first plurality of UEs 144a may establish a wireless communication link to a first cell site 146*a* that communicatively couples the UEs 144*a* to a network 148. The second plurality of UEs 144*b* may establish a wireless communication link to a second cell site 146*b* that communicatively couples the UEs 144*b* to the network 148. The third plurality of UEs 144*c* may establish a wireless communication link to a third cell site 146*c* that communicatively couples the UEs 144*c* to the network 148. The UEs 144 may be any of a mobile phone, a smart phone, a personal digital assistant (PDA), a wearable computer, a headset computer, a laptop computer, a notebook computer, or a tablet computer. The network may be one or more private networks, one or more public networks, or a combination thereof.

Geolocations associated with the UEs 144 may be collected and stored in a location data store 159. Some of the geolocations may be provided by at least some of the UEs 144 through self-locating, for example using a GPS receiver on a UE 144 and sending GPS location coordinates to the location data store 159. Some of the geolocations may be provided by the cell sites 146, for example providing the geolocation of a cell site 146 as a proxy for the location of a UE 144 attached via a wireless link to the cell site 146. Some of the geolocations may be provided by multilateration techniques or by trilateration techniques, for example by analyzing signal strengths of a radio signal emitted by a UE 144 received by a plurality of cell sites 146 at known geolocations. The geolocation associated with the UEs 144 may be referred to in some contexts as location fixes of the UEs 144.

The geolocations are stored in the location data store 159 as a location along with an associated timestamp (date and time) identifying when the UE 144 was determined or inferred to be at the location. The geolocations also comprise an identity of the mobile communication device and an identity of the cell site to which the device is attached to. In an embodiment, the geolocations may further comprise an identity of a tile in which the location is located. The location may be identified with latitude-longitude values, with a geohash value, or with another location identity system.

This geolocation information associated with the UEs 144 may desirably be analyzed to determine proximity of the UEs 104 to the POIs 102. For example, analysis may be able to determine how many UEs 144 passed within eyesight of a POI 102 (e.g., a digital billboard). Analysis may be able to determine how long on average UEs 144 dwell in proximity to a POI 102 (e.g., a restaurant in an office building). This analysis can be summarized in statistics that are segmented by time slots, for example hourly time slots or half-hour time slots, or some other time slot. The presence of a UE 144 proximate to a POI 102 may be referred to as an intersection of the UE 144 with the POI 102.

The system 140 further comprises an analysis server 158 that executes an analysis application 160 that analyzes the geolocation data associated with the UEs 102 (e.g., location fixes of the UEs 102) stored in the location data store 159. The analysis server 158 may be implemented as a computer system. Computer systems are described further hereinafter. The analysis application 160 may be executed periodically, for example daily or weekly.

In embodiment, when the UE 144 is moving on a highway travel route or on a light rail travel route there may be an insufficient number of location fixes in the location data store 159 to smoothly trace the travel route followed by the UE 144, for example from a residence to a work place. The analysis application 160 may access a digital map data store 150 to read one or more digital maps of existing highway travel routes, light rail travel routes, footpath travel routes, and/or other travel type routes. The analysis application 160 may then infer a travel route taken by the UE 144 from a first geolocation to a second geolocation by imputing the unknown path taken by the UE 144 to be an algorithmically selected route in the digital map that connects the two geolocations.

The inference of a travel route taken by the UE 144 may produce a different result depending on whether it is assumed the UE 144 is traveling on a highway travel route, a light rail travel route, or a footpath travel route. It is a teaching of the present disclosure that the analysis application 160 considers information available in the geolocation in associating the geolocation to specific travel modes. For example, the analysis application 160 may search a list of cell sites that are located in the subway system (e.g., underground, at subway stops) for the cell site identity associated with geolocation. The list of cell sites that are located in the subway system may be stored in the memory of the analysis server 158 or in the location data store 159. If the analysis application 160 finds a match, that geolocation is assumed to be on a light rail travel route. The analysis application 160 may analyze geolocations to determine if it lies within a geofenced area that is defined to be associated with a particular travel mode. Geofenced areas may be defined and stored in the locations data store 159. Geofenced areas are a contiguous extent of space and may be defined by a perimeter specified as a plurality of locations forming vertices of a polygonal perimeter. A geofenced area may be explicitly associated with a specific travel mode, for example with a highway travel mode, a footpath travel mode, a light rail travel mode. For example a first geofenced area may identify an extensive park which is off limits to motor vehicles. If the geolocation is located within the first geofenced area, the geolocation is assumed by the analysis application 160 to be on a footpath travel route. A second geofenced area may be associated with an interstate highway. If the geolocation is located within the second geofenced area, the geolocation is assumed by the analysis application 160 to be on a highway travel route.

If a geolocation cannot be associated to a specific travel type route by the above methods, the geolocation is further analyzed by the analysis application 160 to determine a rate of speed associated with the geolocation. If the speed is above a first predefined speed threshold, the analysis application 160 deems the geolocation to be on a highway travel route. If the speed is below a second predefined speed threshold, where the second speed threshold is less than the first speed threshold, the analysis application 160 deems the geolocation data item to be on a footpath travel route.

Geolocations that cannot be associated to a specific travel type route by the above methods may be attributed to both a highway travel route and to a footpath travel route, inferred geolocations on both highway travel routes and footpath travel routes associated with the geolocations are determined, intersections of geolocations with POIs 102 are determined, and the results of the intersection analysis involving the highway travel route solutions are compared to the results of the intersection analysis involving footpath travel route solutions. The fitter solution may be chosen, which then resolves which travel type route ought to be assumed for the given geolocations.

The first geolocation and the second geolocation may each separately be determined by the analysis application 160 as a centroid of a plurality of geolocations that are located close to each other. For example, when a user is at work during a workday, a plurality of geolocations may be captured and stored in the location data store 159, where the geolocations are located close to each other (e.g., within 200 feet of each other).

For example, when a user is at home after work, a plurality of geolocations may be captured and stored in the location data store 159, where the geolocations are located close to each other. In some contexts, the plurality of geolocations located close to each other (e.g., within a predefined radius of the centroid, for example a radius of 300 feet or a radius of 1000 feet) may be referred to as a cluster of location fixes or as simply a cluster. The first geolocation may be defined by the geolocation of the centroid of a first cluster of location fixes of a UE 144 and the second geolocation may be defined by the geolocation of the centroid of a second cluster of location fixes of the same UE 144. The timestamp associated with the first geolocation may be a latest timestamp of the location fixes associated with the first cluster, and the timestamp associated with the second geolocation may be the earliest timestamp of the location fixes associated with the second cluster. Alternatively, the timestamp associated with the first geolocation may be an earliest timestamp of the location fixes associated with the first cluster, and the timestamp associated with the second geolocation may be the latest timestamp of the location fixes associated with the second cluster.

The analysis application 160 may select an imputed route between the two geolocations from a plurality of routes defined in the digital map data store 150. Having determined an assumed travel type, this selection process restricts the algorithmic selection to travel routes of the appropriate travel type routes. For example, if the analysis application 160 deemed the two geolocations to be on a highway travel route, the selection is made from among available highway travel routes. If the analysis application 160 deemed the two geolocations to be on a light rail travel route, the selection is made from among available light rail travel routes. If the analysis application 160 deemed the two geolocations to be on a footpath travel route, the selection is made from among available footpath travel routes. The analysis application 160 may further select the travel route the UE 144 is assumed to travel on based at least in part on identifying a shortest path between actual geolocation data points or location fixes (or cluster centroids), for example using an open source routing machine. Imputing the route comprises imputing the actual geolocations to a route, even though the actual geolocation may not be located on the route. This may be referred to in some contexts as snapping the geolocation to a route. The geolocation may not actually be on a route because the geolocation is imprecise (e.g., the UE 144 was on a route, but the location information has a 50 yard error which places it off the route) or because the UE 144 was not on a route (e.g., the UE 144 was in an NFL stadium not physically on a roadway).

Based on the actual geolocations and the time stamps associated with the actual geolocations for the UE 144 (or the centroid and timestamp of a cluster of geolocations of the UE 144), inferred geolocations of the UE 144 between the two actual geolocations and along the imputed route can be determined and associated to a time stamp by the analysis application 160 and an inferred rate of travel between the two actual geolocations can be determined. These inferred geolocations can be stored in the location data store 159 and used along with actual geolocations by the analysis application 160. This process of determining inferred geolocations can be performed for any number of UEs 144. In an embodiment, the process of determining inferred geolocations for UEs 144 may be performed daily. For more details on location clusters and inferring geolocations and/or location fixes of the UE 144, see U.S. patent application Ser. No. 15/944,512 filed Apr. 3, 2018, titled "Mobile Viewshed Analysis," by Prashanth Dannamaneni, et al, which is incorporated herein by reference in its entirety.

In an embodiment, the digital maps stored in the digital map data store 150 may represent roads or routes as a sequence of route segments that abut one another. For example a first end of a first route segment abuts a first end of a second route segment, a second end of the second route segment abuts a first end of a third route segment, a second end of the third route segment abuts a first end of a fourth route segment, etc. In an embodiment, these route segments may comprise mathematical abstractions or computer representations referred to as edges and vertices (route segments abut one another at the vertices). A route traversed by a UE 144 can then be represented as a sequence of route segments. To determine if the device (and the associated human user) passes through or next to a point-of-interest (POI)—which may be referred to herein as an intersection of the device with the POI—the analysis application 160 can analyze a definition of the POI with reference to the sequence of route segments traversed by the device. Results of the analysis of geolocation intersections with POIs may be stored in an intersections data store 162. Definitions of POIs 120 may be stored in a POI data store 164. The analysis application 160 may analyze the geolocations 130 and the POIs 102 periodically to determine intersections and develop statistics on intersections (rates, hourly distributions of intersection counts for each POI 102), for example daily or weekly.

Figure 4:
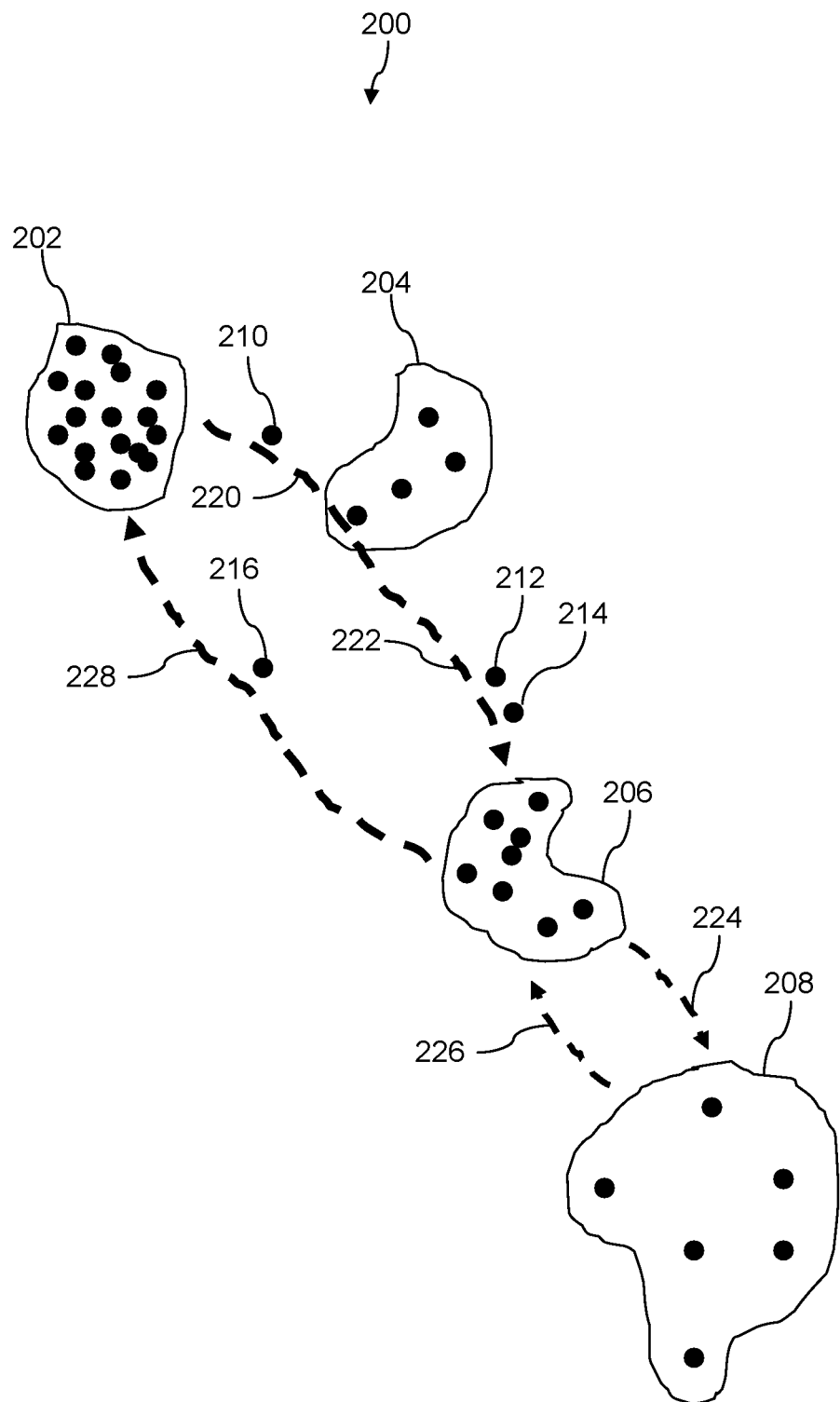
FIG. 4 is an illustration of clustered geolocations of a mobile communication device according to an embodiment of the disclosure.

Turning now to FIG. 4, an example illustration of a daily travel route 200 of a mobile communication device user is described. A plurality of geolocations or location fixes, each represented by a black dot, are associated with a single UE 144. In an embodiment, each geolocation is created by a communication event, for example a message transmitted from the UE 144 to the cell site 146 or a message transmitted from the cell site 146 to the UE 144. The geolocation may be generated by the cell site 146 pursuant to the event and stored in the location data store 159. Each of the geolocations comprises a location (for example a location of a cell site 146 which is deemed a proxy for the approximate location of the UE 144) and a time stamp.

In an embodiment, the geolocations to be analyzed all have a time stamp that falls within a predefined period of time, such as a 12-hour period, a 24-hour period, a 48-hour period, a week period, or other period of time. Said in other words, while geolocations may be retained in the location data store 159 for longer periods of time, the analysis application 160 may only analyze or be concerned with those geolocations that fall within the predefined period of time.

The analysis application 160 (or a separate application such as a clustering application) executing on the analysis server 158 may associate some of the geolocations to a first cluster 202, to a second cluster 204, to a third cluster 206, and to a fourth cluster 208. Some of the geolocations—a first geolocation 210, a second geolocation 212, a third geolocation 214, and a fourth geolocation 216—may not be associated with any of the clusters 202, 204, 206, 208. For example, the analysis application 160 may analyze the geolocations using a clustering algorithm, for example the DBSCAN (density-based spatial clustering of applications with noise) or another clustering algorithm.

A centroid of each cluster 202, 204, 206, 208 may be determined as the centroid location of the geolocations associated with the subject cluster. The centroid location may be considered to be the "average location" of the geolocations associated with the subject cluster. For example, if a geolocation comprises a pair of location coordinates (a latitude and a longitude, for example), the first ordered coordinate of the centroid would be the average of the first ordered coordinates of the geolocations of the cluster and the second ordered coordinate of the centroid would be the average of the second ordered coordinates of the geolocations of the cluster. The location of each cluster may be deemed to be the centroid location.

A dwell time of the UE 144 in each cluster may be determined as well as an earliest time and a latest time in each cluster. Based on earliest times and the latest times defined for each cluster, a travel sequence of the UE 144 may be defined, for example from the first cluster 202 to the second cluster 204, from the second cluster 204, to the third cluster 206, from the third cluster 206 to the fourth cluster 208. From the fourth cluster 208 to the third cluster 206, and from the third cluster 206 to the first cluster 202. The first cluster 202 may be a residence of the subscriber, the second cluster 204 may be associated with a cafe location that the subscriber stops at on the way to work, the third cluster 206 may be associated with a work location, and the fourth cluster 208 may be associated with a lunch restaurant location.

Analysis by the analysis application 160 may determine that the subscriber travels on a first route 220 from the first cluster 202 to the second cluster 204, a second route 222 from the second cluster 204 to the third cluster 206, a third route 224 from the third cluster 206 to the fourth cluster 208, a fourth route 226 from the fourth cluster 208 to the third cluster 206, and a fifth route 228 from the third cluster 206 to the first cluster 202. In some cases, the combination of the first route 220 and the second route 222 may be substantially the same as the fifth route 228, with the provision that they are traversed in opposite directions (i.e., the streets traversed are the same but traversed in opposite directions). In some cases the third route 224 is substantially the same as the fourth route 226, with the provision that they are traversed in opposite directions. Alternatively, the first route 220 combined with the second route 222 may be different from the fifth route 228 (i.e., the subscriber travels home by a different travel route than he or she takes when traveling to work in the morning, for example to make a detour to stop at a cafe in the morning), or the third route 224 may be different from the fourth route 226 (i.e., the subscriber returns from lunch by a different path to avoid heavy traffic caused by an automobile accident on the third route 224). The analysis application 160 may determine the routes 220, 222, 224, 226, 228 using mapping applications, for example using an open source routing machine (OSRM) route determination tool or other application. The highway mapping application may identify multiple possible routes or pathways between the first cluster 202 and the second cluster 204, from the second cluster 204 to the third cluster 206, from the third cluster 206 to the fourth cluster 208, from the fourth cluster 208 to the third cluster 206, and from the third cluster 206 to the first cluster 202 and may choose a fastest route among the possible routes. In an embodiment, the geolocations 210, 212, 214, 216 that are not associated with any of the clusters 202, 204, 206, 208 may be used to select one of the multiple routes identified by the mapping application as possible routes.

Having determined travel routes among the clusters 202, 204, 206, 208 imputed geolocations between the clusters 202, 204, 206, 208 may be synthesized. Any desired number of imputed geolocations may be synthesized for a route. In an embodiment, a predefined number of imputed geolocations per unit of travel distance may be determined, for example five imputed geolocations per mile, ten imputed geolocations per mile, 20 imputed geolocations per mile, or some other number of imputed geolocations per mile. In an embodiment, the number of imputed geolocations per unit of travel distance may vary with an area of a geographic tile in which the geolocations are located. Thus, for larger geographic tiles fewer imputed geolocations per mile are synthesized, and for smaller geographic tiles more imputed geolocations per mile are synthesized.

Clustering of geolocations may be performed using clustering algorithms. The clustering algorithms may rely on some tuning parameters such as a cluster distance radius. It is a teaching of the present disclosure that different clustering tuning parameters are employed for clustering geolocations associated with different travel modes. For example, a first radius tuning parameter may be used when clustering geolocations associated with a light rail travel route, a second radius tuning parameter may be used when clustering geolocations associated with a highway travel route, and a third radius tuning parameter may be used when clustering geolocations associated with a footpath travel route. In an embodiment, a first clustering algorithm may be used when clustering geolocations associated with a light rail travel route, a second clustering algorithm may be used when clustering geolocations associated with a highway travel route, and a third clustering algorithm may be used when clustering geolocations associated with a footpath travel route.

Figure 5:
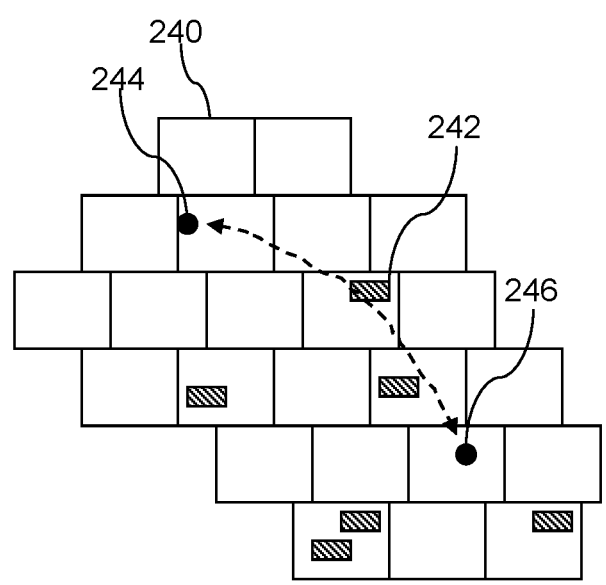
FIG. 5 is an illustration of geographical tiling according to an embodiment of the disclosure.

Turning now to FIG. 5, a plurality of geographic tiles 240 are illustrated. The geographic tiles 240 may be equal sized across a large area such as the extent of the United States. In another embodiment, the geographic tiles 240 may vary in size depending on a population density. For example, geographic tiles 240 in Wyoming may be bigger in area than geographic tiles 240 in New York City. In an embodiment, the size of geographic tiles 240 may be determined based on R-tree analysis. The number of objects that are analyzed to derive a size of geographic tiles 240 in this R-tree analysis may be a number of human beings residing per unit area, a number of mobile communication devices per unit area, a number of out-of-home content presentation assets per unit area, or some other number of objects per unit area. In an embodiment, the number of different geographic tile sizes may be less than 5, less than 20, or less than 100. In an embodiment, the area of the largest geographic tile may be at least 1000 times the area of the smallest geographic tile, may be at least 100 times the area of the smallest geographic tile, or may be at least 10 times the area of the smallest geographic tile.

As illustrated in FIG. 5, a mobile communication device (e.g., UE 144) may move from a first point 244 to a second point 246. In examples, the points 244, 246 may be centroids of clusters. In traversing between the points, the device traverses a plurality of tiles 240. One of the tiles 240 comprises a POI 242. An analysis of intersections of device with the POI 242 need only look at geolocations associated with the tile in which the subject POI 242 is located, avoiding the intersection analysis of geolocations associated with all the other tiles 240, thereby reducing the analysis problem or reducing the analysis challenge. The tile to which a POI 242 is associated may be identified in the tile identity 124 of the POI definition 120.

Figure 6A:
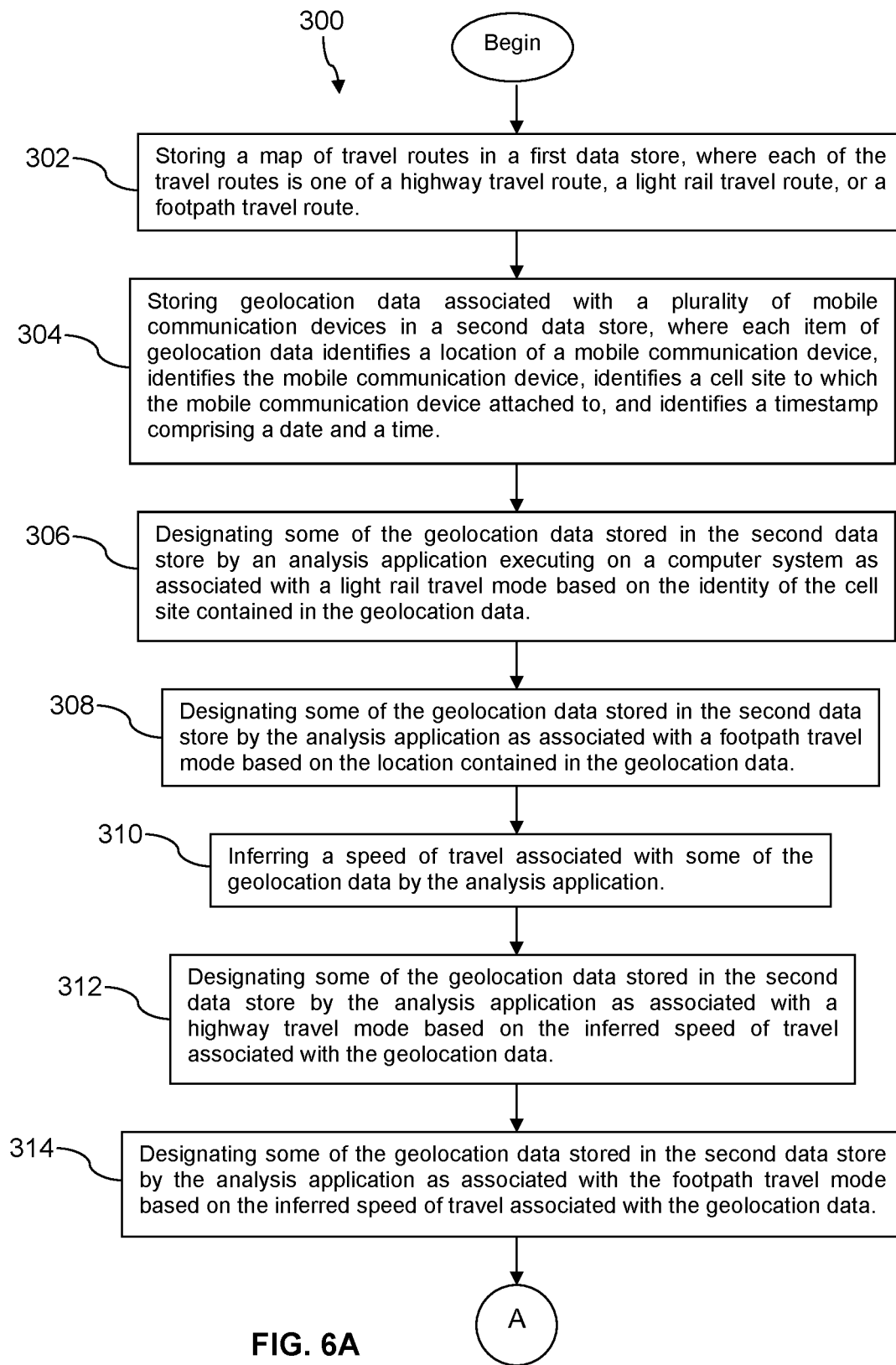
FIG. 6A and FIG. 6B is a flow chart of another method according to an embodiment of the disclosure.
Figure 6B:
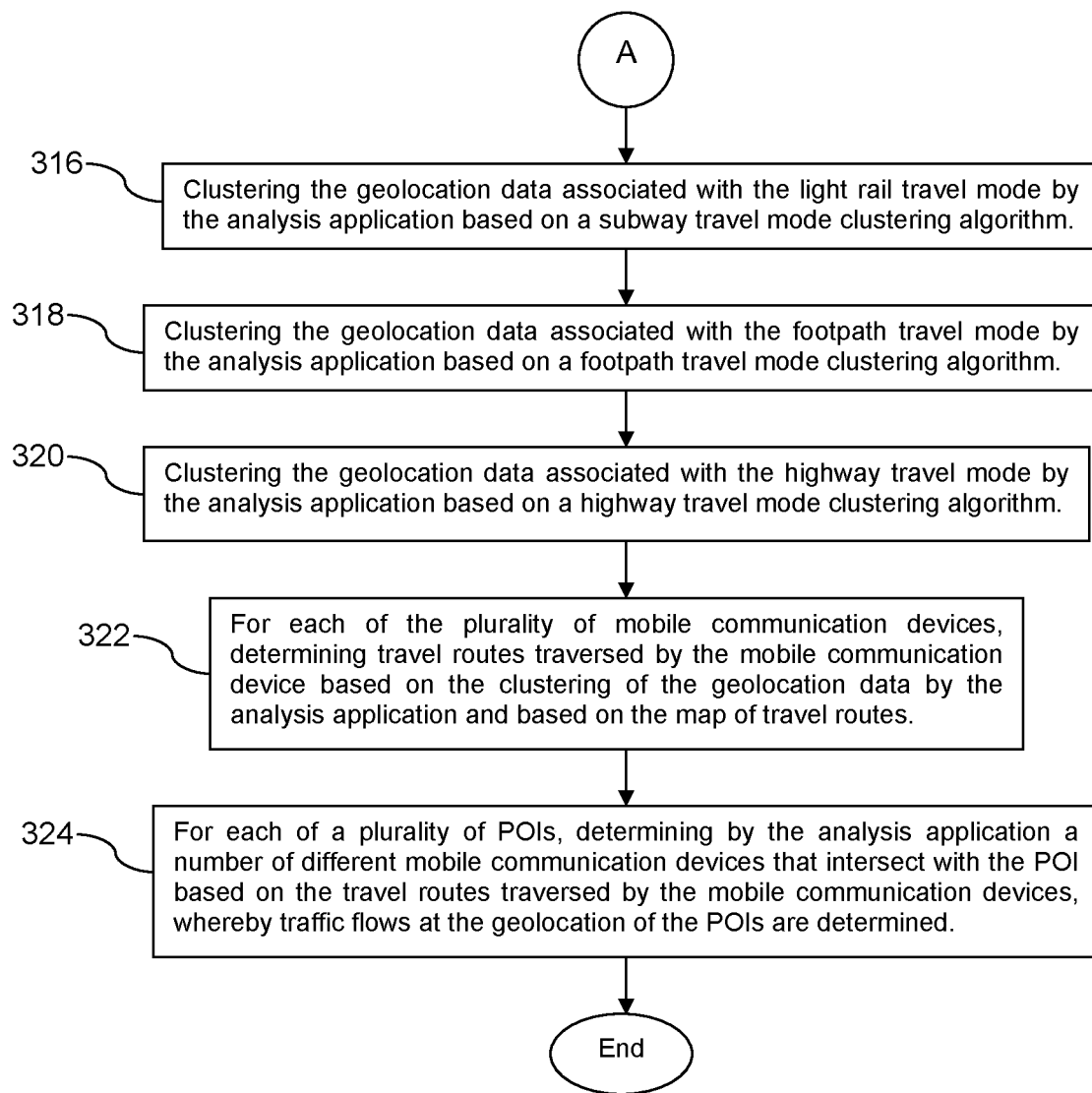

Turning now to FIG. 6A and FIG. 6B, a method 300 is described. In an embodiment, the method 300 is a geolocating method of sorting geolocation data associated with a plurality of mobile communication devices into different travel modes, clustering the geolocation data according to different clustering algorithms based on the different travel modes of the geolocation data, determining travel routes traversed by the plurality of mobile communication devices based on the clustering of the geolocation data, and analyzing the intersections of points-of-interest (POIs) and the travel routes to determine a traffic flow at the POI.

At block 302, the method 300 comprises storing a map of travel routes in a first data store, where each of the travel routes is one of a highway travel route, a light rail travel route, or a footpath travel route. In an embodiment, the light rail travel route or routes comprises one or more subway travel routes. At block 304, the method 300 comprises storing geolocation data associated with a plurality of mobile communication devices in a second data store, where each item of geolocation data identifies a location of a mobile communication device, identifies the mobile communication device, identifies a cell site to which the mobile communication device attached to, and identifies a timestamp comprising a date and a time. In an embodiment, the geolocation data further identifies a tile (e.g., a geographical tile). In some contexts the geolocation data may be referred to as a geolocation data structure or a geolocation data object.

At block 306, the method 300 comprises designating some of the geolocation data stored in the second data store by an analysis application executing on a computer system as associated with a light rail travel mode based on the identity of the cell site contained in the geolocation data. In an embodiment, the processing of block 306 may comprise designating some of the geolocation data as associated with a subway travel mode based on the identity of the cell site contained in the geolocation data. For example, the analysis application may determine that the cell site identity contained in the geolocation data is present in a list of cell sites located in the subway system.

At block 308, the method 300 comprises designating some of the geolocation data stored in the second data store by the analysis application as associated with a footpath travel mode based on the location contained in the geolocation data. For example, the location of the geolocation data may be determined by the analysis application to be located within a geofenced area associated with the footpath travel mode.

At block 310, the method 300 comprises inferring a speed of travel associated with some of the geolocation data by the analysis application. At block 312, the method 300 comprises designating some of the geolocation data stored in the second data store by the analysis application as associated with a highway travel mode based on the inferred speed of travel associated with the geolocation data. At block 314, the method 300 comprises designating some of the geolocation data stored in the second data store by the analysis application as associated with the footpath travel mode based on the inferred speed of travel associated with the geolocation data.

At block 316, the method 300 comprises clustering the geolocation data associated with the subway travel mode by the analysis application based on a subway travel mode clustering algorithm. At block 318, the method 300 comprises clustering the geolocation data associated with the footpath travel mode by the analysis application based on a footpath travel mode clustering algorithm. At block 320, the method 300 comprises clustering the geolocation data associated with the highway travel mode by the analysis application based on a highway travel mode clustering algorithm.

At block 322, the method 300 comprises, for each of the plurality of mobile communication devices, determining travel routes traversed by the mobile communication device based on the clustering of the geolocation data by the analysis application and based on the map of travel routes.

At block 324, the method 300 comprises, for each of a plurality of POIs, determining by the analysis application a number of different mobile communication devices that intersect with the POI based on the travel routes traversed by the mobile communication devices, whereby traffic flows at the geolocation of the POIs are determined.

Figure 7:
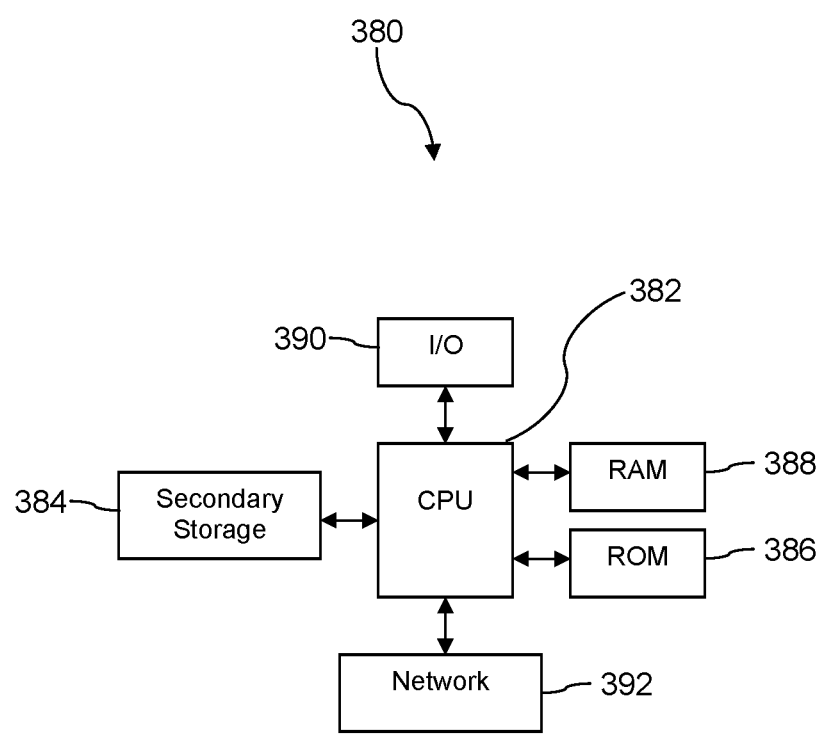
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A geolocating method of sorting geolocation data associated with a plurality of mobile communication devices into different travel modes, clustering the geolocation data according to different clustering algorithms based on the different travel modes of the geolocation data, determining travel routes traversed by the plurality of mobile communication devices based on the clustering of the geolocation data, and analyzing the intersections of points-of-interest (POIs) and the travel routes to determine a traffic flow at the POI, comprising:

storing a map of travel routes in a first data store, where each of the travel routes is one of a highway travel route, a light rail travel route, or a footpath travel route;

storing geolocation data associated with a plurality of mobile communication devices in a second data store, where each item of geolocation data identifies a location of a mobile communication device, identifies the mobile communication device, identifies a cell site to which the mobile communication device attached to, and identifies a timestamp comprising a date and a time;

designating some of the geolocation data stored in the second data store by an analysis application executing on a computer system as associated with a light rail travel mode based on the identity of the cell site contained in the geolocation data;

designating some of the geolocation data stored in the second data store by the analysis application as associated with a footpath travel mode based on the location contained in the geolocation data;

inferring a speed of travel associated with some of the geolocation data by the analysis application;

designating some of the geolocation data stored in the second data store by the analysis application as associated with a highway travel mode based on the inferred speed of travel associated with the geolocation data;

designating some of the geolocation data stored in the second data store by the analysis application as associated with the footpath travel mode based on the inferred speed of travel associated with the geolocation data;

clustering the geolocation data associated with the light rail travel mode by the analysis application based on a light rail travel mode clustering algorithm;

clustering the geolocation data associated with the footpath travel mode by the analysis application based on a footpath travel mode clustering algorithm;

clustering the geolocation data associated with the highway travel mode by the analysis application based on a highway travel mode clustering algorithm;

for each of the plurality of mobile communication devices, determining travel routes traversed by the mobile communication device based on the clustering of the geolocation data by the analysis application and based on the map of travel routes; and for each of a plurality of POIs, determining by the analysis application a number of different mobile communication devices that intersect with the POI based on the travel routes traversed by the mobile communication devices, whereby traffic flows at the geolocation of the POIs are determined.

2. The geolocating method of claim 1, wherein the POI is one of a billboard, a building, or a presentation screen.

3. The geolocating method of claim 1, wherein the mobile communication devices are selected from the group consisting of mobile phones, smart phones, headset computers, wearable computers, laptop computers, notebook computers, and tablet computers.

4. The geolocating method of claim 1, wherein the map of travel routes comprises at least one highway travel route digital map, at least one light rail travel route digital map, and at least one footpath travel route digital map.

5. The geolocating method of claim 1, wherein designating some of the geolocation data as associated with the light rail travel mode comprises accessing a list of cell sites located in a subway system and comparing the identity of cell sites contained in the geolocation data to the identity of cell sites contained in the list of cell sites located in the subway system.

6. The geolocating method of claim 1, wherein the footpath travel mode clustering algorithm uses a footpath clustering radius parameter, the light rail travel mode clustering algorithm uses a light rail clustering radius parameter, and the highway travel mode clustering algorithm uses a highway clustering radius parameter.

7. The geolocating method of claim 1, wherein the first data store comprises a plurality of maps of geofenced areas, where each geofenced area is a contiguous extent of space that is associated with one of the footpath travel mode, the highway travel mode, or the light rail travel mode, and wherein designating some of the geolocation data as associated with the footpath travel mode based on the location contained in the geolocation data comprises determining that the location contained in the geolocation data falls within a geofenced area associated with the footpath travel mode.

8. The geolocating method of claim 1, wherein the geolocation data further identifies a tile in which the location of the geolocation data lies, wherein the POIs are each associated with a tile in which the POI lies, and where for each POI the analysis application compares geolocations associated with the same tile as the POI of travel routes traversed by the mobile communication devices in determining a number of intersections with the POI.

9. A geolocating system that clusters geolocation data associated with a plurality of mobile communication devices according to different clustering algorithms based on different travel modes associated with the geolocation data, determines travel routes traversed by the plurality of mobile communication devices based on the clustering of the geolocation data, and analyzes the intersections of points-of-interest (POIs) and the travel routes to determine a traffic flow at the POI, comprising:
　at least one processor;
　a non-transitory memory;
　a first data store comprising a map of travel routes, where each travel route is one of a highway travel route, a light rail travel route, or a footpath travel route;
　a second data store comprising geolocation data associated with a plurality of mobile communication devices, where each item of geolocation data identifies a location of a mobile communication device, identifies the mobile communication device, identifies a cell site to which the mobile communication device is attached to, and identifies a timestamp comprising a date and a time; and
　an analysis application stored in the non-transitory memory that, when executed by the at least one processor:
　　designates some of the geolocation data stored in the second data store as associated with a light rail travel mode based on the identity of the cell site contained in the geolocation data,
　　designates some of the geolocation data stored in the second data store as associated with a footpath travel mode based on the location contained in the geolocation data,
　　infers a speed of travel associated with some of the geolocation data,
　　designates some of the geolocation data stored in the second data store as associated with a highway travel mode based on the inferred speed of travel associated with the geolocation data,
　　designates some of the geolocation data stored in the second data store as associated with the footpath travel mode based on the inferred speed of travel associated with the geolocation data,
　　clusters the geolocation data associated with the highway travel mode based on a highway travel mode clustering algorithm,
　　clusters the geolocation data associated with the light rail travel mode based on a light rail travel mode clustering algorithm,
　　clusters the geolocation data associated with the footpath travel mode based on a footpath travel mode clustering algorithm,
　　for each of the plurality of mobile communication devices, determines travel routes traversed by the mobile communication device based on the clustering of the geolocation data and based on the map of travel routes, and
　　for each of a plurality of POIs, determines a number of different mobile communication devices that intersect with the POI based on the travel routes traversed by the mobile communication devices, whereby traffic flows at the geolocation of the POIs are determined.

10. The geolocating system of claim 9, wherein the map comprises a first digital map comprising highway routes, a second digital map comprising light rail routes, and a third digital map comprising footpath routes.

11. The geolocating system of claim 10, wherein the first digital map, the second digital map, and the third digital map represent routes as a plurality of route segments, and each route is represented as an edge terminated at each end by a vertex.

12. The geolocating system of claim 9, wherein the geolocations are represented in part as geohashes or as latitude-longitude coordinates.

13. The geolocating system of claim 9, wherein the POIs each comprises a location and a perimeter.

* * * * *